Figure 1:
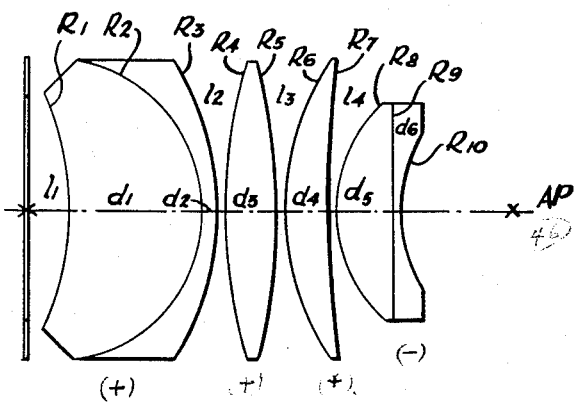

April 17, 1951  L. BERTELE  2,549,158
WIDE-ANGLE EYEPIECE LENS SYSTEM
Filed April 17, 1947  2 Sheets-Sheet 1

INVENTOR.
Ludwig Bertele
BY
ATTORNEYS

April 17, 1951        L. BERTELE        2,549,158

WIDE-ANGLE EYEPIECE LENS SYSTEM

Filed April 17, 1947        2 Sheets-Sheet 2

INVENTOR.
Ludwig Bertele
BY
ATTORNEYS

UNITED STATES PATENT OFFICE 2,549,158

WIDE-ANGLE EYEPIECE LENS SYSTEM

Ludwig Bertele, Heerbrugg, Switzerland

Application April 17, 1947, Serial No. 742,031
In Switzerland April 18, 1946

4 Claims. (Cl. 88—57)

The present invention refers to an eyepiece with a very wide angle, whereby it is possible:

1. To give the tangential branch of the astigmatic curve a course in such a manner that the tangential image curve produced by the objective and a reversing system (if any) is to a great extent compensated simultaneously for all inclinations by the corresponding tangential image curve of the eyepiece, and 2. To reduce the pupillary aberration to an admissible quantity despite the very wide angle.

If the field of view of a number of known eyepieces is increased beyond 70°, it is found that the further course of the tangential branch of the astigmatic curve is most unsatisfactory, with the result that the advantage gained by increasing the field appears very questionable owing to the lack of sharpness.

Moreover, as a rule, when the angle becomes wider the pupillary aberration increases to an inadmissible degree.

It is impossible with the usual means of correction to achieve any decisive improvement in the course of the curve together with a reduction of the pupillary aberration.

A cemented surface with dispersing effect is introduced either in the member that follows the field of view diaphragm or in the member that contains the diaphragm. The diameter of the field of view diaphragm determines the size of the viewable image field. If the ocular is free of distortion, the diameter of the field of view diaphragm is equal to $2f \tan w$, wherein $f$ is the focus and $w$ is the semi-angular field of the ocular. If the ocular has an edge distortion, as is usually the case, the diameter of the field of view diaphragm will be diminished by the percentage of distortion for the semi-angular field $w$.

According to the present invention, this cemented surface is unusually strongly curved in the direction of the eye, contrary to similarly cemented surfaces in known eyepieces. The cemented surface is dispersing if the refractive index of the glass before this surface is lower than after this surface. The radius of this strongly curved surface is always less than 74% of the diameter of the diaphragm. The curvature can be carried so far that this spherical surface is utilized up to an angle of aperture of 70° and more. For the purpose of obtaining a very wide angle, the first member, which may be considered as a collective, is followed by a number of other separate members.

In order to correct the other errors the ordinary cemented surfaces can be introduced in the members used for this purpose.

In order to improve the curve of the sagittal branch of the astigmatic curve the meniscal eye-lens can be made very thick and concave towards the diaphragm, namely, it can have an axial thickness which is greater than 0.15 times and smaller than 0.9 times the total focal length of the ocular.

Figures 1 to 5 inclusive illustrate different forms of the lens system.

Figure 2:
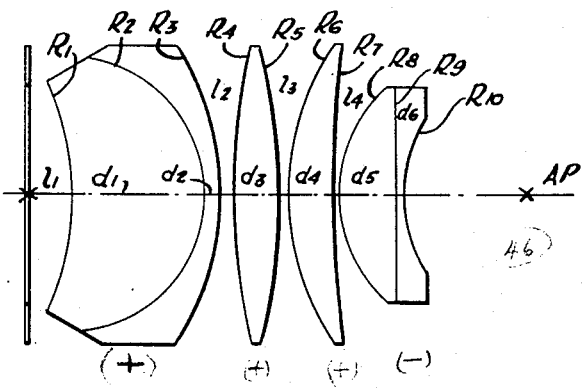

Figs. 1 and 2 illustrate eyepieces with a field of 80°. The member located next to the field of view diaphragm consists of a positive and a negative lens cemented along surfaces $R_2$ of strong curvature directed toward the eye, the refraction index before the cemented surface being smaller than after the cemented surface. The second member is an ordinary collecting lens of a glass having the smallest possible chromatic dispersion. The third member is also an ordinary collecting lens of a glass having the smallest possible chromatic dispersion, the surface having the greater curvature being directed away from the eye. The fourth member is a meniscus lens, bent in the direction of the field of view diaphragm and consisting of cemented positive and negative lenses, the dispersion of the positive lens being as small as possible, while the dispersion of the negative lens is very large; the axial thickness of the meniscus lens is about 40% of the entire focal length, and the curvature directed toward the eye has a radius equal to 1.0 times the total focal length of the eyepiece. In Fig. 1 the radius of surface 2 is approximately 70% of the diameter of the diaphragm. In Fig. 2 its radius is approximately 62.5% of said diameter. As compared with Fig. 1, the example in Fig. 2 achieves a further improvement of the tangential image curve. If the entry pupil is situated 930 mm. before the surface I in both cases, a more favourable course of the tangential image curve is achieved in Fig. 2. In Fig. 1 the pupillary aberration amounts to 9.3 mm. for the maximum inclination: in Fig. 2 it is 2.6 mm. In both cases the diameter of the diaphragm is 141 mm. and the focal length 100 mm.

Figure 3:
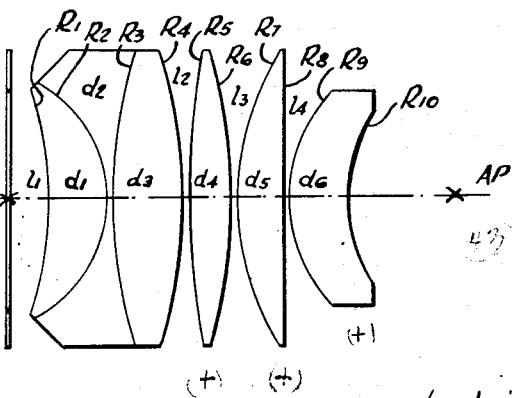

Fig. 3 illustrates an eyepiece with a field of 80°. The first member located close to the field of view diaphragm is composed of three individual lenses which are cemented together, whereby two collecting lenses enclose a negative lens. The cemented surface $R_2$ located closest to the field of view diaphragm is strongly curved toward the eye. The second member is an ordinary collecting lens of glass having small dispersion. The third member is also a collecting lens of glass having small dispersion with its strongly curved surface directed away from the eye. The fourth member is a meniscus lens which is not cemented and which is bent toward the field of view diaphragm having 42% of the focal length, the curvature directed toward the eye having a radius equal to 1.05 times the total focal length of the eyepiece.

Here the tangential curvature of the image is not eliminated, but is such as to compensate the corresponding tangential image curve of the objective. The effect of the curved surface 2, whose radius is 56% of the diameter of the diaphragm, is to give the curve such a course that compensation is achieved for all inclinations. The entry pupil is situated 930 mm. before the surface 1. For the maximum inclination the pupillary aberration is 8.7 mm. The diameter of the diaphragm is 144 mm., the focal length 100 mm.

Figure 4:
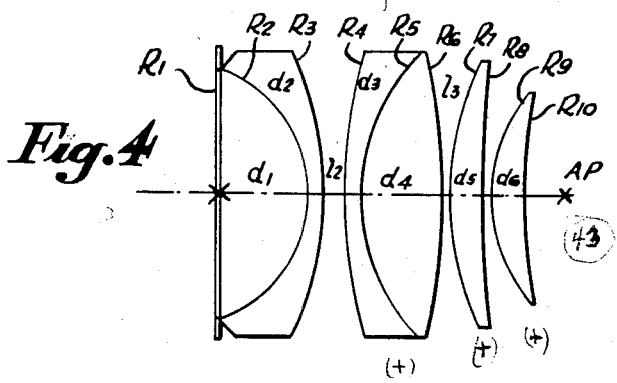

Fig. 4 illustrates an eyepiece with a field of 90°. The first member located close to the field of view diaphragm consists of a positive and a negative lens cemented along a surface $R_2$ which is strongly bent in the direction of the eye. The refraction index before the cemented surface is smaller than thereafter. The second member consists of cemented positive and negative lenses, the common cemented surface being directed toward the field of view diaphragm, the negative lens consisting of a glass with strong dispersion, while the positive lens is of a glass having small dispersion. The third member is an ordinary collecting lens of a glass with small dispersion, the stronger curved surface being directed away from the eye. The fourth member is a meniscus lens which is not cemented and which is bent toward the field of view diaphragm, with an axial thickness of 22.5 and a curvature directed toward the eye having a radius of 3.77 of the total focal length of the eyepiece. The radius of the surface 2 is 55% of the diameter of the diaphragm. Here too the course of the tangential image curve is so chosen that compensation is assured with the corresponding curve of the objective for all inclinations. The entry pupil is situated 1000 mm. before the surface 1. The maximum pupillary aberration is approximately 8.6 mm. The diameter of the diaphragm is 158 mm., the focal length 100 mm.

Figure 5:
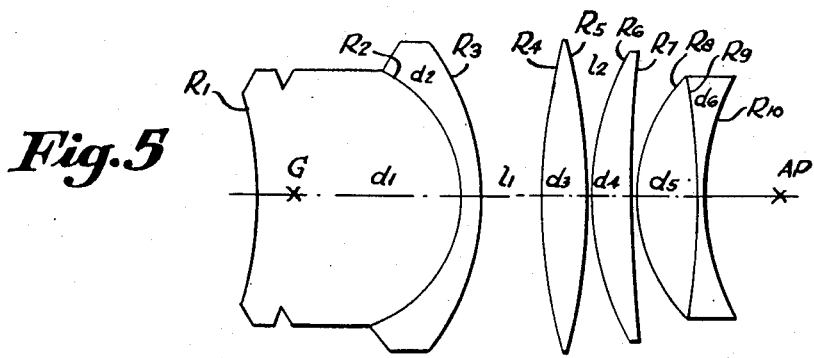

Fig. 5 illustrates an eyepiece with a field of 80°. The first member consists of a positive and a negative lens, cemented along a surface $R_2$ which is strongly curved toward the eye, the field of view diaphragm being located within the positive lens. The second member is an ordinary collecting lens of a glass having small dispersion, while the third member is also an ordinary collecting lens of a glass with small dispersion, the stronger curved surface being directed away from the eye. The fourth member is a meniscus lens, bent toward the field of view diaphragm, comprising a positive lens having the smallest possible dispersion and cemented to a negative lens having a strong dispersion; the axial thickness is 44.5% of the total focal length and the curvature directed toward the eye has a radius equal to 1.7 times the total focal length of the eyepiece. The radius of surface 2 is 64% of the diaphragm. The latter is situated within the member and its position is marked G in Fig. 5. The course of the tangential image curve effects a compensation with the corresponding tangential curve of the objective. The diameter of the diaphragm is 137 mm., the focal length 100 mm.

In the drawing, AP indicates the position of the eye, while G indicates the position of the field of view diaphragm.

The optical data of the different examples are given below: $r$ are the radii, $d$ the thickness of the lenses, $l$ the spaces between the latter, $n$ the indices of refraction, while $v$ represents the chromatic dispersion.

Example, Fig. 1

| | | | $n_D$ | $v$ |
|---|---|---|---|---|
| $L_1$ | $R_1 = -170.7$ | $l_1 = 29.0$ | | |
| | $R_2 = -98.0$ | $d_1 = 88.6$ | 1.5750 | 41.3 |
| $L_2$ | $R_3 = -180.0$ | $d_2 = 14.3$ | 1.6433 | 47.8 |
| | $R_4 = +449.0$ | $l_2 = 0.6$ | | |
| $L_3$ | $R_5 = -373.0$ | $d_3 = 34.3$ | 1.6138 | 56.3 |
| | $R_6 = +174.0$ | $l_3 = 0.6$ | | |
| $L_4$ | $R_7 = +2,186.0$ | $d_4 = 31.4$ | 1.6138 | 56.3 |
| | $R_8 = +91.4$ | $l_4 = 0.6$ | | |
| $L_5$ | $R_9 = \infty$ | $d_5 = 35.7$ | 1.6138 | 56.3 |
| $L_6$ | $R_{10} = +101.5$ | $d_6 = 4.3$ | 1.6989 | 30.1 |

Example, Fig. 2

| | | | $n_D$ | $v$ |
|---|---|---|---|---|
| $L_1$ | $R_1 = -182.0$ | $l_1 = 29.4$ | | |
| | $R_2 = -88.6$ | $d_1 = 88.6$ | 1.5750 | 41.3 |
| $L_2$ | $R_3 = -180.0$ | $d_2 = 14.3$ | 1.6433 | 47.8 |
| | $R_4 = +449.0$ | $l_2 = 0.6$ | | |
| $L_3$ | $R_5 = -373.0$ | $d_3 = 34.3$ | 1.6138 | 56.3 |
| | $R_6 = +174.0$ | $l_3 = 0.6$ | | |
| $L_4$ | $R_7 = +2,186.0$ | $d_4 = 31.4$ | 1.6138 | 56.3 |
| | $R_8 = +91.4$ | $l_4 = 0.6$ | | |
| $L_5$ | $R_9 = \infty$ | $d_5 = 35.7$ | 1.6138 | 56.3 |
| $L_6$ | $R_{10} = +101.5$ | $d_6 = 4.3$ | 1.6989 | 30.1 |

Example, Fig. 3

| | | | $n_D$ | $v$ |
|---|---|---|---|---|
| $L_1$ | $R_1 = -241.0$ | $l_1 = 28.9$ | | |
| | $R_2 = -80.3$ | $d_1 = 45.1$ | 1.6200 | 36.3 |
| $L_2$ | $R_3 = +307.2$ | $d_2 = 3.4$ | 1.6889 | 31.1 |
| $L_3$ | $R_4 = -176.7$ | $d_3 = 52.1$ | 1.6073 | 59.5 |
| | $R_5 = +550.5$ | $l_2 = 0.9$ | | |
| $L_4$ | $R_6 = -329.5$ | $d_4 = 31.6$ | 1.6073 | 59.5 |
| | $R_7 = +190.8$ | $l_3 = 0.8$ | | |
| $L_5$ | $R_8 = \infty$ | $d_5 = 30.2$ | 1.6073 | 59.5 |
| | $R_9 = +98.7$ | $l_4 = 0.6$ | | |
| $L_6$ | $R_{10} = +104.6$ | $d_6 = 42.3$ | 1.6073 | 59.5 |

Example, Fig. 4

| | | | $n_D$ | $v$ |
|---|---|---|---|---|
| $L_1$ | $R_1 = \infty$ | $l_1 = 0.0$ | | |
| | $R_2 = -86.2$ | $d_1 = 63.0$ | 1.5673 | 42.8 |
| $L_2$ | $R_3 = -213.0$ | $d_2 = 7.9$ | 1.6477 | 33.9 |
| | $R_4 = +506.0$ | $l_2 = 15.0$ | | |
| $L_3$ | $R_5 = +133.0$ | $d_3 = 9.2$ | 1.6889 | 31.1 |
| $L_4$ | $R_6 = -325.0$ | $d_4 = 55.0$ | 1.5596 | 61.2 |
| | $R_7 = +197.0$ | $l_3 = 0.8$ | | |
| $L_5$ | $R_8 = -1,305.0$ | $d_5 = 24.0$ | 1.5596 | 61.2 |
| | $R_9 = +103.0$ | $l_4 = 0.8$ | | |
| $L_6$ | $R_{10} = +377.0$ | $d_6 = 22.5$ | 1.5596 | 61.2 |

*Example, Fig. 5*

|  |  |  | $n_D$ | $v$ |
|---|---|---|---|---|
| $L_1$ | $R_1 = -233.6$ | $l_1 = -18.3$ |  |  |
|  | $R_2 = -87.9$ | $d_1 = 133.0$ | 1.56299 | 60.7 |
| $L_2$ |  | $d_2 = 10.6$ | 1.64738 | 33.9 |
|  | $R_3 = -166.3$ | $l_2 = 37.9$ |  |  |
| $L_3$ | $R_4 = +468.3$ | $d_3 = 28.1$ | 1.60712 | 59.5 |
|  | $R_5 = -468.3$ | $l_3 = 1.6$ |  |  |
|  | $R_6 = +196.0$ |  |  |  |
| $L_4$ | $R_7 = +986.4$ | $d_4 = 25.4$ | 1.60712 | 59.5 |
|  |  | $l_4 = 0.5$ |  |  |
|  | $R_8 = +113.9$ |  |  |  |
| $L_5$ | $R_9 = -794.6$ | $d_5 = 39.2$ | 1.65988 | 57.1 |
| $L_6$ |  | $d_6 = 5.3$ | 1.72786 | 28.3 |
|  | $R_{10} = +169.0$ |  |  |  |

I claim:

1. An eyepiece comprising, in combination, a field of view diaphragm and at least four separate, axially-spaced members, the first member which is closest to said diaphragm consisting of a body having two lenses cemented along a crescent-shaped surface which is strongly curved in the direction of the eye, and which has a radius of curvature always less than 74% of the diameter of said diaphragm, the refractive index of the glass before the cemented surface being lower than after said cemented surface, the second member consisting of a collecting lens having small chromatic dispersion, the third member consisting of a collecting lens having small chromatic dispersion and surfaces of different curvatures, the surface having the greatest curvature being directed away from the eye, the fourth member consisting of a crescent-shaped body with its concavity turned toward the field of view diaphragm, with an axial thickness larger than 0.15 times and smaller than 0.9 times the total focal length, the curvature directed toward the eye having a radius which is larger than 0.5 times and smaller than 5 times the total focal length of the eyepiece.

2. An eyepiece comprising, in combination, a field of view diaphragm and at least four separate, axially-spaced members, the first member which is closest to said diaphragm consisting of a body having two lenses cemented along a surface which is strongly curved in the direction of the eye and which has a radius of curvature always less than 74% of the diameter of said diaphragm, the refractive index of the glass before the cemented surface being lower than after the cemented surface, the second member consisting of a negative lens of larger dispersion and a positive lens of smaller dispersion cemented to said negative lens to form a collecting lens-body, the third member consisting of a collecting lens and a glass of smaller dispersion having surfaces of different curvatures, the surface with greater curvature being directed away from the eye, the fourth member consisting of a meniscus lens bent toward the field of view diaphragm and having an axial thickness which is larger than 0.15 times and less than 0.9 times the total focal length of the eyepiece, the curvature directed toward the eye having a radius which is larger than 0.5 times and smaller than 5 times the total focal length of the eyepiece.

3. An eyepiece comprising, in combination, a field of view diaphragm and at least four separate, axially-spaced members, the first member which is closest to said diaphragm consisting of a body having two lenses cemented along a surface which is strongly curved in the direction of the eye and which has a radius of curvature always less than 74% of the diameter of said diaphragm, the refractive index and the chromatic dispersion of the glass before the cemented surface being lower than after the cemented surface, the second member consisting of a collecting lens of the glass of smaller dispersion, the third member consisting of a collecting lens and a glass of smaller dispersion having surfaces of different curvatures, the surface with greater curvature being directed away from the eye, the fourth member consisting of at least two cemented lenses constituting a body bent toward the field of view diaphragm, the dispersion of the positive lens being considerably smaller than the dispersion of the negative lens, the axial thickness of said fourth member being larger than 0.15 times and less than 0.9 times the total focal length of the eyepiece, the curvature directed toward the eye having a radius which is larger than 0.5 times and smaller than 5 times the total focal length of the eyepiece.

4. An eyepiece comprising, in combination, a field of view diaphragm and at least four separate, axially-spaced members, the first member which contains said diaphragm consisting of a body having two lenses cemented along a surface which is strongly curved in the direction of the eye and which has a radius of curvature always less than 74% of the diameter of said diaphragm, the refractive index of the glass before the cemented surface being lower than after the cemented surface, the second member consisting of a collecting lens of the glass of smaller dispersion, the third member consisting of a collecting lens and a glass of smaller dispersion having surfaces of different curvatures, the surface with greater curvature being directed away from the eye, the fourth member consisting of at least two cemented lenses constituting a body bent toward the field of view diaphragm and having an axial thickness which is larger than 0.15 times and less than 0.9 times the total focal length of the eyepiece, the curvature directed toward the eye having a radius which is larger than 0.5 times and smaller than 5 times the total focal length of the eyepiece, the dispersion of the positive lens being considerably smaller than the dispersion of the negative lens.

LUDWIG BERTELE.

REFERENCES CITED

The following references are of record in the file of this patent:

UNITED STATES PATENTS

| Number | Name | Date |
|---|---|---|
| 1,478,704 | Erfle | Dec. 25, 1923 |
| 2,206,195 | Konig | July 2, 1940 |
| 2,419,151 | Miles | Apr. 15, 1947 |
| 2,423,676 | Altman | July 8, 1947 |

FOREIGN PATENTS

| Number | Country | Date |
|---|---|---|
| 461,062 | Germany | June 13, 1928 |
| 570,499 | Germany | Feb. 16, 1933 |
| 409,465 | Great Britain | May 3, 1934 |
| 565,851 | Great Britain | Nov. 30, 1944 |